United States Patent [19]

Gaiser

[11] 4,329,846

[45] May 18, 1982

[54] FAST FILL DISPLACEMENT MASTER CYLINDER

[75] Inventor: Robert F. Gaiser, Stevensville, Mich.

[73] Assignee: The Bendix Corporation, Southfield, Mich.

[21] Appl. No.: 130,671

[22] Filed: Mar. 17, 1980

[51] Int. Cl.³ ............................................. B60T 11/20
[52] U.S. Cl. ....................................... 60/562; 60/578; 60/589
[58] Field of Search ................. 60/574, 562, 578, 589, 60/588, 594; 92/171

[56] References Cited

U.S. PATENT DOCUMENTS

| | | | |
|---|---|---|---|
| 2,444,043 | 6/1948 | Hawley | 60/588 |
| 2,672,009 | 3/1954 | Hense | 60/578 |
| 2,961,832 | 11/1960 | Randol | 92/171 |
| 2,977,767 | 4/1961 | Randol | 60/588 |
| 3,946,563 | 3/1976 | Rivetti | 60/562 |
| 4,091,619 | 5/1978 | Carré | 60/562 |
| 4,133,178 | 1/1979 | Brooks, Sr. | 60/578 |
| 4,156,348 | 5/1979 | Brown | 60/578 |

FOREIGN PATENT DOCUMENTS 1170802  5/1964  Fed. Rep. of Germany ........ 60/562

Primary Examiner—Abraham Hershkovitz
Attorney, Agent, or Firm—Paul David Schoenle; Ken C. Decker

[57] ABSTRACT

In a master cylinder a housing defines a bore for movably receiving a pair of pistons. A pair of seals cooperate with the pair of pistons to define a pair of pressure chambers and a sleeve disposed within the bore fixedly locates the pair of seals within the bore so that when the pair of pistons are moved within the bore, the pair of pistons move relative to the pair of seals to displace fluid within the pressure chambers to respective brake circuits. A bearing member engages the sleeve to fixedly retain the sleeve within the bore and cooperates with one of the pair of pistons to define an auxiliary chamber which is contracted during a brake application to communicate fluid to one of the pair of pressure chambers.

12 Claims, 1 Drawing Figure

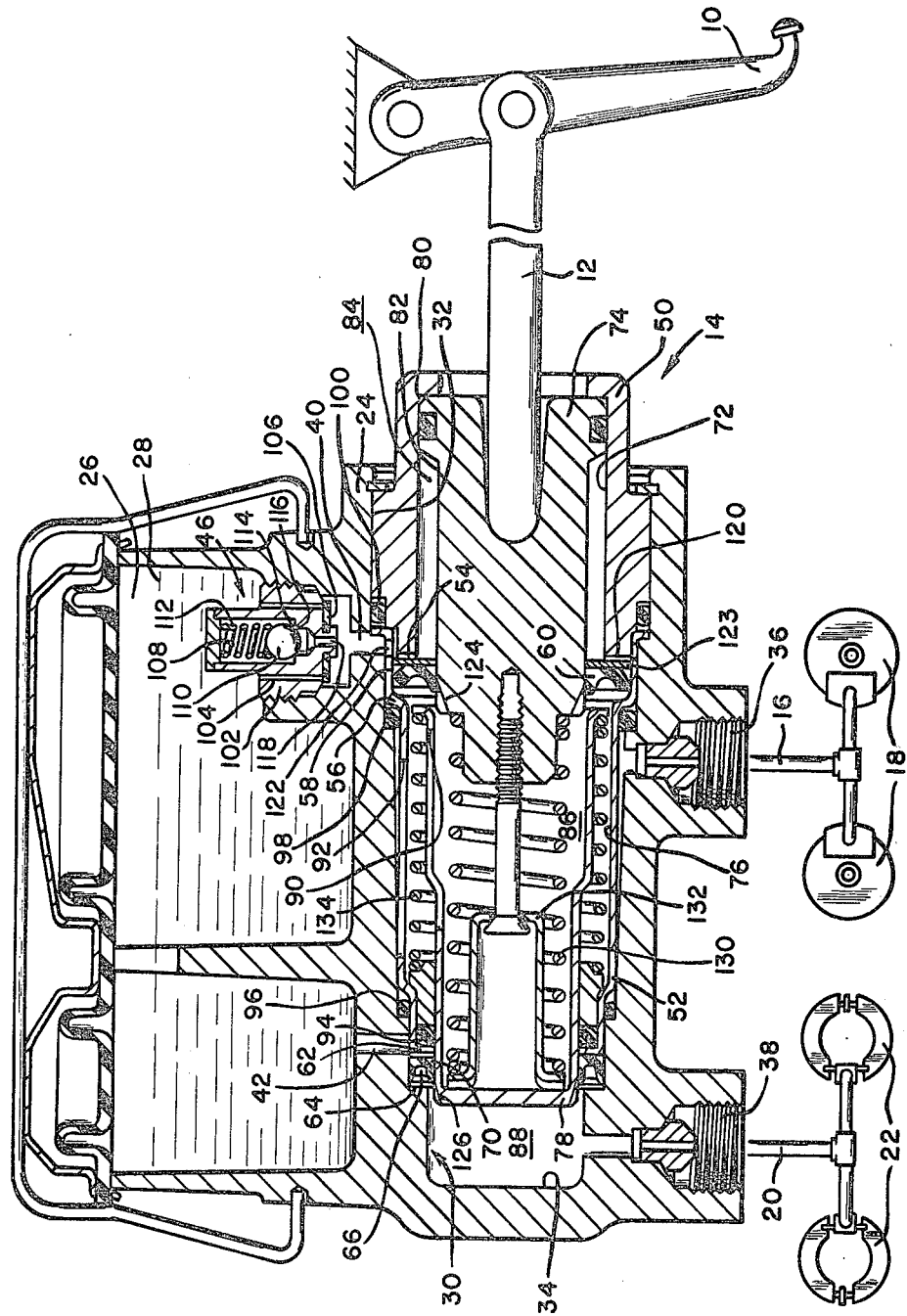

FAST FILL DISPLACEMENT MASTER CYLINDER

The invention relates to a master cylinder which moves a pair of pistons past a pair of seals to displace fluid from a pair of pressure chambers to respective brake circuits. A sleeve within a housing bore positions the seals within the bore and a bearing member retains the sleeve within the bore.

Displacement type master cylinders such as illustrated in U.S. Pat. No. 4,249,381, German Pat. No. 2,624,088, U.S. Pat. No. 2,977,767, and U.S. Pat. No. 3,946,563 provide for contraction of a pressure chamber in response to movement of a piston relative to a seal. As a result the contracted pressure chamber increases fluid pressure therein to communicate the same to a brake circuit. With respect to German Pat. No. 2,624,088, only one pressure chamber is pressurized via displacement. That is, the primary chamber is defined by a stationary seal, whereas the secondary chamber is defined by a seal which moves with a secondary piston. Although the wall of the primary chamber need not be machined to a close tolerance, the wall of the secondary chamber requires machining to a close tolerance so that the seal associated with the secondary piston remains concentrically disposed within the secondary chamber regardless the position therein while slidably engaging the wall of the secondary chamber.

The invention provides for displacement of fluid from both pressure chambers. A bearing member retains a sleeve within a bore and the sleeve cooperates with a pair of seals to fixedly dispose the pair of seals within the bore. The pair of pistons are engageable with the pair of seals, respectively, to substantially define the pair of pressure chambers and the pistons are both movable relative to their respective seals to contract the volume of the pair of pressure chambers. In addition, the bearing member cooperates with one of the pair of pistons to define an auxiliary or fast fill chamber to communicate fluid pressure to one of the pair of pressure chambers during initial braking.

The advantages offered by the present invention are a housing bore for a master cylinder which requires less critical manufacturing tolerances. Also, the bearing member is adapted to define an auxiliary fast fill chamber with the one piston in the absence of an added step to the housing bore. As a result a displacement master cylinder for both pressure chambers is provided with a fast fill chamber to quickly take up hydraulic slack and running clearances in the brake circuit associated with the one pressure chamber.

The invention will now be described in detail with reference to the attached drawing which illustrates a specific embodiment.

The sole FIGURE is a schematic illustration of a brake system having a sectional view of a master cylinder constructed according to the present invention.

In the sole FIGURE, the brake system includes a brake pedal 10 coupled to an input rod 12 extending into the master cylinder 14. The master cylinder 14 fluidly couples to a first brake circuit 16 which leads to a front disc brake assembly 18 and also fluidly couples to a second brake circuit 20 which leads to a rear drum brake assembly 22. Upon a brake application, the pedal 10 is rotated about a fixed pivot to bias the input rod into the master cylinder. In response to the movement of the input rod, fluid pressure is generated within the master cylinder to communicate fluid pressure to the brake circuits 16 and 20.

The master cylinder 14 includes a housing 24 defining a reservoir 26 filled with brake fluid 28. The housing also is provided with a longitudinally extending stepped bore 30 leading from an opening 32 to a bottom wall 34. A pair of outlets 36 and 38 intersect the bore 30 and lead to the brake circuits 16 and 20, respectively, to communicate the bore with the brake circuits. A pair of compensating and replenishing ports 40 and 42 extend from the reservoir 26 to the bore 30 to communicate fluid to the latter. The compensating port 40 communicates with the reservoir 26 via a relief and replenish valve assembly 46, the operation of which will be explained later.

In accordance with the invention a bearing member 50 is disposed within the bore 30 adjacent the opening 32 in order to fixedly locate a sleeve 52. The bearing member terminates in an abutment 54 opposing an abutment 56 on the sleeve to define a groove 58 which receives a first seal 60. The sleeve terminates in an abutment 62 opposing an abutment 64 on the housing wall of the stepped bore to define a groove 66 which receives a second seal 70. The bearing member includes a bore 72 movably receiving a first piston 74 which is coupled to the input rod 12 by suitable means. The diameter of bore 72 defines a dimension intermediate the inner diameter of seal 60 and the outer diameter of seal 60, so that abutment 54 aligns with or opposes seal 60. The sleeve 52 also includes a bore 76 movably receiving a second piston 78 which is substantially U-shaped in cross section. The first piston 74 forms a radially outer surface 80 sealingly engaging the bore 72 and a radially inner surface 82 engaging the first seal 60 so as to define a fast fill or auxiliary chamber 84.

With the first piston 74 engaging seal 60 and the second piston 78 engaging seal 70, the first piston cooperates with the seal 60 to substantially define a first pressure chamber 86 and the second piston cooperates with the seal 70 to substantially define a second pressure chamber 88. The second piston and sleeve are apertured at 90 and 92, respectively, to communicate the first pressure chamber with the outlet 36, while the second pressure chamber 88 communicates directly with the outlet 38.

A pair of O-ring seals 94 and 96 between the sleeve and second piston and wall of bore 30, respectively, seal the first pressure chamber from the port 42. An O-ring seal 98 seals the first pressure chamber from the port 40 while an O-ring seal 100 seals the bearing member to the wall of bore 30.

The relief and replenish valve assembly 46 includes a casing 102 with passages 104 extending from the reservoir to a flexible flapper valve disc 106. A central passage 108 receives a relief ball valve 110 biased by spring 112 against seat 114. The seat is notched as at 116 to permit restricted flow of fluid from the reservoir to the port 40. The central passage 108 is also restricted at 118.

In order to communicate fluid from the reservoir 26 to the auxiliary chamber 84, the abutment 54 of bearing member 50 is provided with radially extending grooves 120 and the sleeve is further apertured at 122 between O-ring seals 98 and 100 so that port 40 leads to the auxiliary chamber 84 via a recess or radial clearance 123 between the bearing member 50 and the sleeve 52 adjacent the aperture 122. A washer 123 is provided between the abutment 54 and the first seal 60 to support the seal. In order to communicate fluid from the reservoir 26 to each pressure chamber, the pistons 74 and 78 are notched or relieved adjacent the seals 60 and 70, respectively, at 124 and 126 to provide a passage from the ports 40 and 42, past the right side of each seal, and through the notches 124 and 126 to the respective pressure chamber.

When a brake application is initiated, the first piston 74 is moved to the left. Fluid disposed within auxiliary chamber 84 is pressurized in response to contraction of the chamber. A portion of the pressurized fluid is returned to the reservoir 26 via restrictions 118 and 114; however, the restriction of seal 60 is less so that a majority of the fluid pressure within auxiliary chamber is initially communicated past seal 60 to first pressure chamber 86. After a predetermined pressure level is reached in chamber 84, the ball relief valve is opened to further open communication of fluid pressure from chamber 84 to reservoir 26. The moving piston extends into cavity 80 to contract first pressure chamber 86 so that the fluid therein is pressurized to communicate fluid pressure to outlet 36.

A spring 130 between piston 74 and retainer 132 is engageable via retainer 132 with piston 78 so that the moving piston 74 biases the piston 78 to also move to the left. Fluid pressure within chamber 86 also acts against the second piston 78 to bias the latter to the left. As a result the fluid within chamber 88 is pressurized to communicate fluid pressure to outlet 38. The movement of the pistons causes the piston notches 124 and 126 to move to the left of seals 60 and 70, respectively, so that the chambers are isolated from the reservoir.

Upon termination of braking a spring 134 extending between the fixed sleeve and second piston cooperates with the decreased pressure in chamber 86 to bias the second piston to return to the position shown in the drawing. The expanding auxiliary chamber 84 creates a pressure drop within the port 40, so that fluid from the reservoir will flow through the restrictions 114 and 118 as well as open flexible flapper valve disc 106 to communicate fluid also through passages 104, port 46, grooves 120 to chamber 84. Once the pistons return to the rest position shown, the pressure within chamber 84 is equalized with the reservoir so the flexible flapper valve closes. Moreover, the notches 124 and 126 communicate with the ports 40 and 42, respectively, in the rest position, to replenish each pressure chamber 86 and 88 with fluid from the reservoir.

The operation of each seal 60 and 70 is more completely described in my U.S. Pat. No. 4,249,381.

I claim:

1. In a master cylinder, the combination of, a housing defining a reservoir and a bore communicating with the reservoir, the housing also including a pair of outlets leading to respective brake circuits, a sleeve disposed within the bore and forming a bore therethrough, a pair of pistons disposed within the sleeve bore, one of the pair of pistons being engageable with an input member to move within the sleeve bore in response to actuation of the input member, the other piston defining a cavity for receiving the one piston and being movable in response to movement of the one piston, the sleeve extending between a pair of seals which cooperate with said pair of pistons respectively, to substantially define a pair of pressure chambers, each of the pair of pressure chambers communicating with a separate brake circuit, the sleeve cooperating substantially with the pair of seals to define fixed positions for the latter within the housing bore, and a bearing member extending into the housing bore, the bearing member engaging the sleeve to fixedly secure the latter within the housing bore, the bearing member also cooperating with one of the pair of seals to define a passage communicating the reservoir with at least one of the pressure chambers, and the bearing member further cooperating with the one piston to substantially define an auxiliary chamber normally communicating with the reservoir, movement of the one piston in response to actuation of the input member communicating fluid within the auxiliary chamber to at least one of the pair of pressure chambers.

2. The master cylinder of claim 1 in which the sleeve defines a first aperture communicating the reservoir with the auxiliary chamber and a second aperture communicating the one pressure chamber with one of the pair of outlets.

3. The master cylinder of claim 2 in which the first aperture on the sleeve also communicates the reservoir with the one pressure chamber.

4. In a master cylinder having a housing defining a reservoir which is normally in communication with a bore within the housing, a pair of pistons movably disposed within the housing bore and cooperating with a pair of seals, respectively, to substantially define a pair of pressure chambers, movement of the pair of pistons within the housing bore generating fluid pressure within each pressure chamber, a sleeve disposed within the housing bore and engageable with the pair of seals, and a bearing member extending into the housing bore to engage the sleeve in order to fixedly position the sleeve within the housing bore characterized by said bearing member cooperating with one of the pistons to substantially define an auxiliary chamber, said bearing member also substantially defining a passage communicating the reservoir with the auxiliary chamber, and said bearing member cooperating with the sleeve to define a first set of opposing abutments engageable with one of the pair of seals to fixedly position the latter within the housing bore.

5. The master cylinder of claim 4 further characterized by the sleeve including an aperture communicating the reservoir with said auxiliary chamber.

6. The master cylinder of claim 5 further characterized by said bearing member including at least one radially extending groove facing the one seal, said one radially extending groove cooperating with said aperture to communicate said auxiliary chamber with said reservoir.

7. In a master cylinder, a housing defining a longitudinally extending bore, a pair of outlets leading outwardly of the housing from the bore, a sleeve disposed within the bore, the sleeve cooperating with a pair of seals to substantially locate the latter within the bore, a pair of pistons cooperating with the pair of seals respectively, to define a pair of pressure chambers containing fluid, one of the pistons being movable relative to one of the seals to pressurize the fluid within one of the pressure chambers and to impart movement to the other piston relative to the other seal so as to pressurize the fluid within the other pressure chamber, and a bearing member engageable with the sleeve to fixedly secure the sleeve within the bore, the bearing member also including a bore receiving the one piston, characterized by said one seal including an outer lip engageable with the sleeve to define an outer diameter for said one seal, said one seal including an inner lip engageable with said one piston to define an inner diameter for said one seal, said one piston having a radially outer surface and a radially inner surface, said bearing member bore defining a wall engageable with said one piston radially outer surface and leading to said one seal, said bearing member bore wall defining a diameter having a dimension substantially intermediate said seal inner and outer diameters, and said bearing member bore wall cooperating with said one piston radially inner surface to substantially form an auxiliary chamber therebetween containing fluid so that upon movement of said one piston the fluid within said auxiliary chamber is pressurized and communicated to said one pressure chamber.

8. In a master cylinder having a housing defining a bore for receiving fluid, a pair of piston assemblies movably disposed within the bore and cooperating with a pair of seals in order to generate fluid pressure within a pair of pressure chambers, each of the pair of pressure chambers communicating with separate brake circuits, a sleeve disposed within the bore and cooperating with at least one seal to substantially define a fixed position for the one seal within the bore and a bearing member disposed within the bore to movably support at least one of the pair of pistons within the bore, characterized by said bearing member opposing said sleeve to fixedly position said sleeve within said bore, said bearing member further cooperating with said one seal and said one piston to define an auxiliary pressure chamber which communicates initially with one of said pair of pressure chambers when the fluid pressure within said auxiliary pressure chamber is above that in said one pressure chamber, said bearing member also cooperating with said sleeve to define a fixed position within said bore for said one seal, and said bearing member defining a bore receiving said one piston, said one piston including a first portion movably engaging the wall of said bearing member bore and a second portion radially spaced from the wall of said bearing member bore such that said auxiliary pressure chamber is substantially disposed at said one piston second portion.

9. The master cylinder of claim 8 in which said bearing member defines a bore and said one piston movably and sealingly engages the wall of said bearing member bore to generate fluid pressure within said auxiliary pressure chamber when said one piston moves relative to said bearing member.

10. The master cylinder of claim 8 in which a reservoir is connected to said housing for communicating fluid to said pair of pressure chambers and said bearing member cooperates with said sleeve to define a fluid path for communicating fluid from said reservoir to said auxiliary pressure chamber.

11. The master cylinder of claim 10 in which said bearing member cooperates with the wall of the housing bore to position a first seal on one side of said fluid path and said sleeve cooperates with the wall of the housing bore to position a second seal on the other side of said fluid path in order to seal said fluid path between said reservoir and said auxiliary pressure chamber.

12. The mater cylinder of claim 8 in which said auxiliary chamber defines an axial dimension which is completely disposed within an axial dimension for said bearing member.

* * * * *